INVENTORS
W. A. STUTSKE
F. H. WOOD JR.
ATTORNEYS

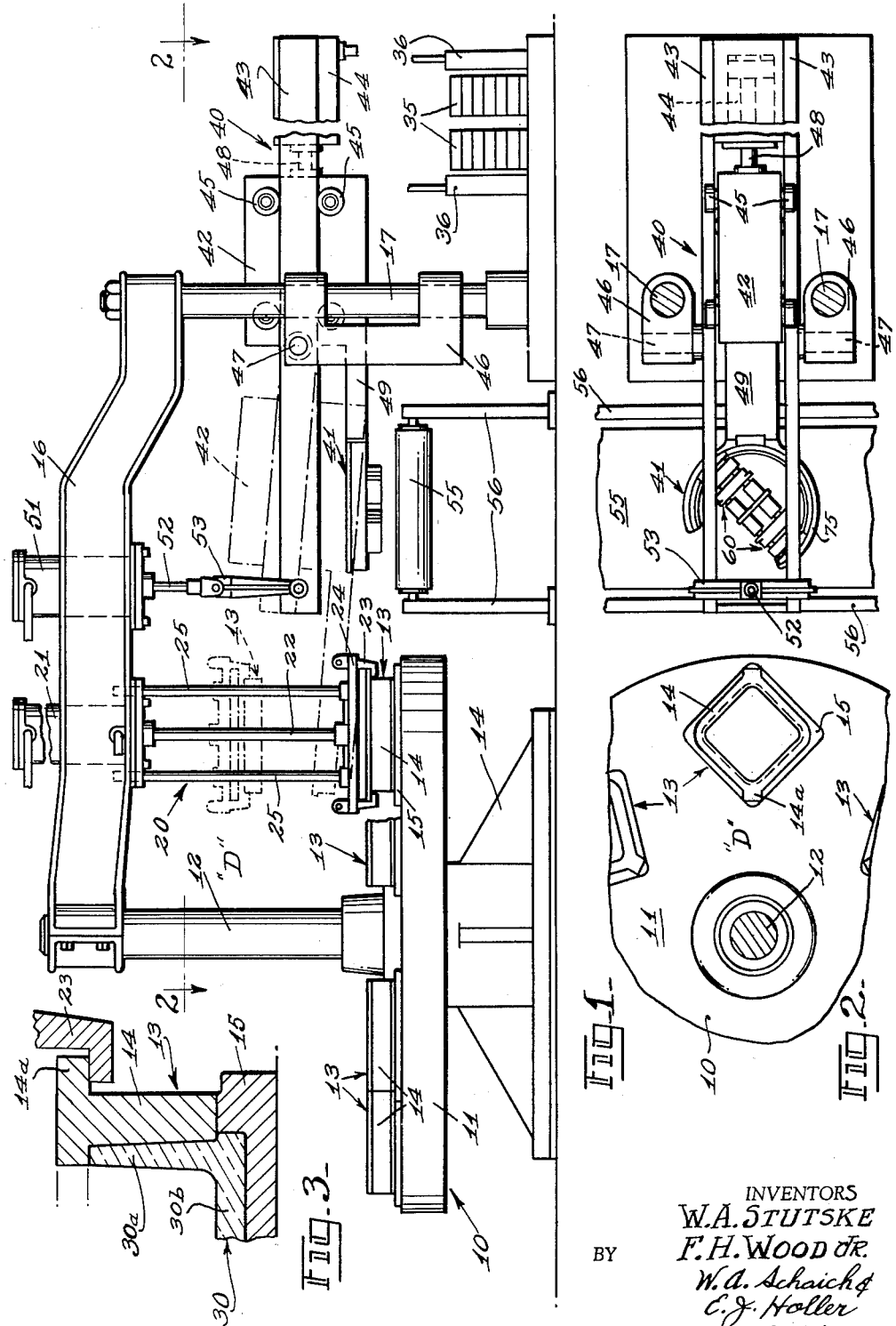

United States Patent Office 3,019,559
Patented Feb. 6, 1962

3,019,559
TAKE-OUT APPARATUS FOR GLASSWARE
William A. Stutske and Frederick H. Wood, Jr., Toledo, Ohio, assignors to Kimble Glass Company, a corporation of Ohio
Filed May 5, 1958, Ser. No. 732,949
10 Claims. (Cl. 49—14)

The present invention relates to glass handling apparatus and more particularly to a mechanism for utilization in combination with glassware forming machines for automatically removing newly-formed ware from a mold of such machine, moving the ware laterally and depositing it upon a suitable supporting surface. Such mechanism is commonly referred to as a take-out mechanism.

The subject automatic take-out mechanism is especially applicable for use in connection with forming machines for removing hollow or cup-like articles, as for example half-sections of a glass building block, from the molds in which they are formed and for transferring them to and placing them on a traveling conveyor.

Previously, in the handling of such block sections, particularly in removing the hot semi-plastic sections from the forming molds, a pair of separable jaw members has been utilized which descend upon an upwardly facing cup-shaped block section in the mold and close upon the section from opposite sides thereof to engage the opposite parallel block sides. To secure proper handling of the block sections, considerable pressure must be exerted on the block section sides by the jaws and because the glass of the side sections is not fully hardened, deformation of the block almost invariably results. Such deformation of the section is usually in the form of a caving in or bending in of the sides which are engaged by the jaws with the ultimate result that subsequently in assembling a pair of sections upon each other to produce a completed integral block, registration of the meeting edges of the block halves is imperfect.

The prior art has heretofore utilized especially designed jaw structures to overcome the above-noted limitations to provide bracing of the inner walls of the block section sides against the inward pressure brought to bear through the block sides from the outer walls thereof by the pressing action of the jaw members. The intended purpose has been to nullify the opposed pressing action of the outer jaws which engage the outer walls of the block section and to provide a double jaw action wherein the opposite sides of the block are engaged independently and pressure is applied thereto both from within and without to produce the necessary stripping and lifting action required in the handling of the section.

An example of such jaw structures has been disclosed in Patent No. 2,191,143, issued February 20, 1940, to Hiatt and Macken, entitled "Glass Handling Apparatus," this patent being assigned to the same assignee as the present application. The jaw structures disclosed therein have been commercially employed for some years, but have been unable to completely eliminate deformation of the block section sides during stripping and lifting of the section from its mold. None of the jaw structures employed heretofore have been fully self-aligning for the application of balanced gripping pressure to the deformable section sides.

Accordingly, it is an object of the present invention to provide means for automatically removing formed articles of glassware from machine molds while the glass is still in a plastic state, holding each of the articles by balanced self-centering gripping force and depositing it on a suitable supporting surface adjacent the machine.

Another object of the present invention is to provide handling apparatus for newly-formed glass articles for their automatic removal from a molding machine, the semi-plastic articles being maintained in shape during handling to permit their final set in finished form precisely as molded.

Another object of the present invention is to provide a take-out mechanism for automatically removing newly-formed hollow glass articles from their molds by furnishing grasping jaws which are self-centering and capable of applying balanced gripping force to upwardly-projecting wall portions of the article.

Another object of the present invention is to provide glassware handling apparatus having grasping jaws which are self-adjusting to accommodate block sections of varying proportions to facilitate their removal from a forming mold, transference and deposition upon an adjacent supporting surface, which apparatus may be arranged to perform automatically the aforementioned steps at a take-out station of a press molding machine.

Another object of the present invention is to provide novel combined shell-lifting and ware take-out apparatus adapted to be employed in synchronism at a ware removal station of a press molding machine, the take-out apparatus providing several pairs of grasping jaws adapted to grip upwardly-projecting opposite wall portions of the ware with equalized gripping pressure.

A still further object of the present invention is to provide novel take-out mechanism adapted for use with either shell-type or partible molds arranged in annular series on a press molding machine, which mechanism provides pairs of ware-gripping jaws capable of both lateral and vertical cyclic movement between loading and unloading positions with the mechanism disposed adjacent the molding machine for operation in timed synchronism therewith.

The specific nature of this invention, as well as other objects and advantages thereof, will become apparent to those skilled in the art from the following detailed description, taken in conjunction with the annexed sheets of drawings on which, by way of preferred example only, are illustrated the preferred embodiments of this invention.

In the accompanying drawings:

FIG. 1 is a side elevational view of a portion of a forming machine and article handling apparatus illustrative of one embodiment of the present invention, several operative members thereof being shown in alternate positions in broken lines.

FIG. 2 is a fragmentary plan view of the machine and article handling apparatus taken along the line 2—2 of FIG. 1.

FIG. 3 is an enlarged fragmentary vertical sectional view of a peripheral portion of one of the molding units mounted on the forming machine.

Figure 4:
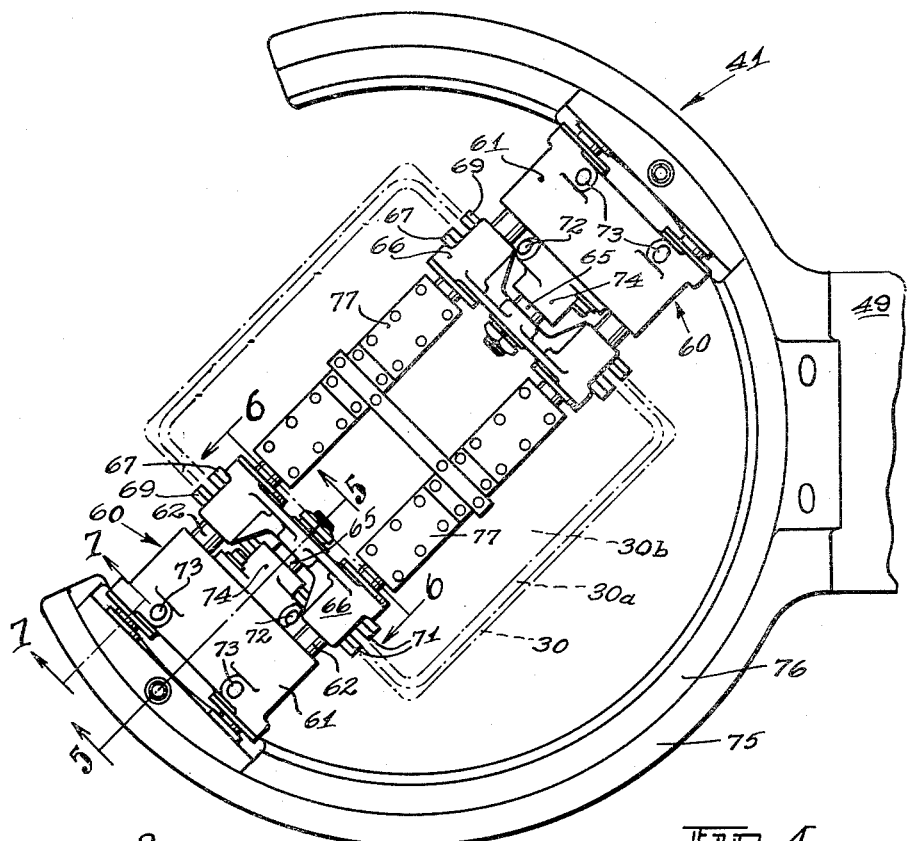
FIG. 4 is an enlarged fragmentary plan view of the article grasping mechanism shown in FIGS. 1 and 2, the article being shown in broken lines.

Referring now to FIG. 1, a portion of a conventional rotary or turret-type glass block forming machine is shown at 10 and includes a rotary mold table 11 adapted to rotate about a stationary vertical column 12. An annular series of similar mold groups or units 13 is mounted on mold table 11 in spaced relationship. The mold units 13 each include a separable mold shell or ring 14 and a bottom plate 15 therefor adapted to form the sidewall and central panel respectively of a glass block half-section, for example.

The mold table 11 is adapted to be indexed periodically to bring the mold units 13 in succession through the various operating stations of the machine and finally to a discharge station "D" as shown in FIGS. 1 and 2. The mold rings 14 are removed from bottom plates 15 by a ring-lifting device 20 and ware handling or take-out apparatus 40 is adapted to transfer the block sections 30 or other hollow or flat-sided ware to a traveling conveyor 55. Conveyor 55 is mounted on support members 56 and may project normal to the axis of the take-out apparatus 40 and nearly tangent to mold table 11.

The forming machine 10 is provided with a press plunger (not shown) for shaping the glass, the plunger being mounted at a forming station of the machine. The plunger conventionally includes a downwardly projecting molding head movable into the mold cavity of each molding unit 13 for molding a hollow article therein such as the block section 30 from a charge of molten glass.

Figure 5:
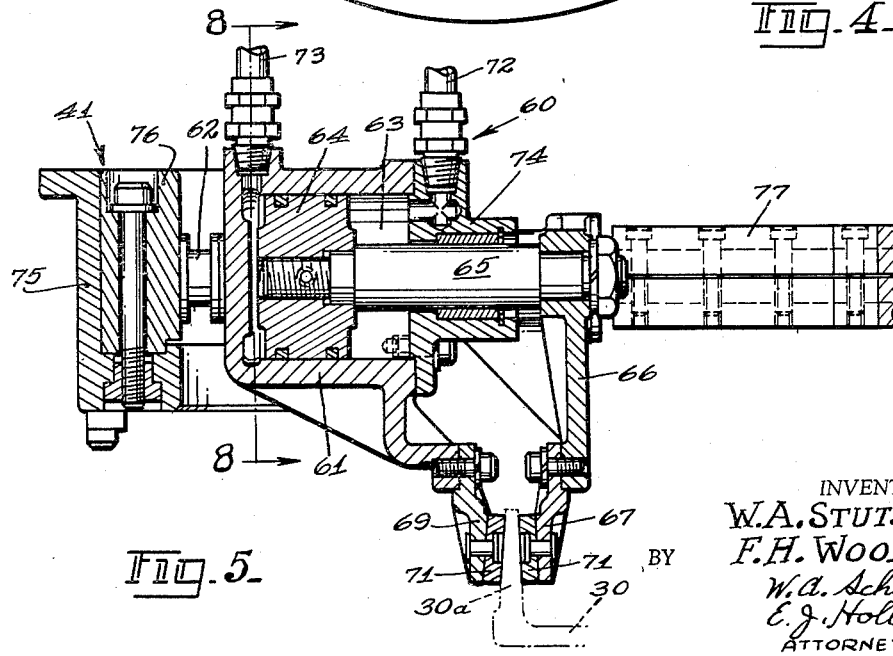
FIG. 5 is a vertical sectional view taken along the line 5—5 of FIG. 4 illustrating the grasping jaw mechanism of the take-out apparatus.

Block sections 30 which are formed by the machine may be generally rectangular in shape as shown in FIG. 4 having an upwardly-projecting annular flange 30a and a flat-sided central panel 30b as shown in FIGS. 3 and 5. The central panel 30b may also have light-directing rib or prism structures formed thereon as known and understood in the art.

As shown enlarged in FIG. 3, mold unit 13 has a rather flat bottom plate 15 and a sidewall forming ring 14 mounted thereon to comprise the molding cavity. Each of the rings 14 have diametrically-opposed projecting flanges 14a adapted to facilitate separation of the ring 14 from its bottom plate 15.

A ring-lifting device 20 is mounted separate from and above the mold table 11 on an overhead horizontal beam member 16 extending between the machine central column 12 and several exterior vertical support columns 17. Beam 16 is positioned at the discharge station "D" of the machine extending radially from column 12. An air cylinder motor 21 is mounted on beam member 16 having a piston rod 22 extending downwardly therefrom into near relationship with mold units 13 at the take-out station. Ring-lifting device 20 has a pair of downwardly and inwardly projecting L-shaped members 23 adapted to engage the ring members 14 as they are brought singly and in succession beneath and into operative connection therewith by rotation of the mold table 11.

The device 20 is normally in its lowermost position during indexing of the mold table 11 to bring flanges 14a into vertical alignment with take-out members 23. Air cylinder 21 and its piston rod 22 are adapted to lift each ring member 14 into a raised position by its flanges 14a with mold table 11 at rest to permit the removal of the molded article 30 at the take-out station "D." The lower movable member 24 of the ring-lifting device 20 is maintained in vertical alignment with air motor 21 by a pair of vertical rods 25 which are carried in vertically-operable relationship therewith. Device 20 is shown in FIG. 1 in its lowermost position in full lines and in an elevated position in broken lines.

Briefly, the article handling or take-out apparatus 40 comprises a combined gripping and lifting mechanism indicated at 41 which is suspended from a projecting portion of a movable carriage 42 that travels both horizontally and inclinedly on pivotal rails 43. Carriage 42 is moved back and forth on rails 43 by an air piston motor 44 mounted at the end of the take-out apparatus distant from mold table 11.

The take-out device 40 has a rigid hollow frame including a pair of spaced-apart rails 43 mounted upon and between a pair of support brackets 46 arranged in adjustable position on vertical columns 17. Inwardly projecting pins 47 are journalled within an upper portion of brackets 46 and provide pivotal support for a medial portion of the rails 43 of the hollow frame. The oppositely disposed pins 47 provide a horizontal axis about which the pivoted frame and rails 43 may be rotated in a vertical plane.

Carriage 42 is mounted on rails 43 by a series of freely-rotatable rollers 45 engaging both the upper and lower surfaces of the rails. Carriage 42 is moved over the rails 43 by a piston rod 48 interconnecting the carriage 42 and a piston of air motor 44. Carriage 42 when moved back-and-forth over rails 43 is adapted to laterally move the ware gripping and lifting mechanism 41 right-to-left into engageable loading relationship over mold table 11 with block section 30 at rest on its bottom plate 15 at the discharge station "D." When the carriage 42 is operated from left-to-right from its loading to an unloading position over conveyor 55, carriage 42 is moved away from mold table 11 to bring the mechanism 41 over conveyor 55 for deposition of the block section thereon.

An air piston motor 51 is mounted in a vertical position supported by beam member 16 over and in vertical alignment with the axis of rails 43 in near relationship with the mold table. A piston rod 52 projects downwardly from air motor 51 and is connected to a clevis 53 which is pivotally connected near the end of rails 43. Air motor 51 is thus able to pivot the take-out device 40 about the horizontal axis of pivot pins 47 so that grasping mechanism 41 may be raised and lowered at both loading and unloading positions of the apparatus.

Carriage 42 has an outwardly projecting end portion 49 which carries the ware grasping device designated by the numeral 41. Jaw grasping mechanism 60 is disposed within a rigid circular ring 75 of device 41 to achieve operative connection with the article to be handled. As shown in FIG. 4, the device 41 is comprised of two interconnected hollow ring members 75 and 76 adapted to support and surround the jaw grasping mechanism 60. Ring 76 is nested within and secured to ring 75.

Grasping mechanism 60 consists of a pair of air cylinder assemblies 61 disposed upon a pair of fixed horizontal rods 62. Rods 62 are arranged in spaced-apart parallel relationship extending across ring 76 with their central axis bisecting the ring center. Each cylinder assembly 61 is adapted to independent slidable movement on rods 62 with respect to an article such as block section 30. Block section 30 which is shown in FIG. 4 in broken lines has an annular essentially rectangular upwardly-projecting flange portion 30a adapted to be engaged by the grasping mechanism.

When the grasping device 60 is brought into near relationship with block section 30 as shown in FIGS. 4 and 5, fluid pressure is supplied to interior annulus 63 of each air cylinder assembly 61 by an inlet line 72. Air pressure, for example, supplied to the cylinder 61 initiates movement of the piston 64 in an outwardly direction away from the center of block section 30. Piston rod 65 having a jaw support 66 attached thereto is moved outwardly upon movement of piston 64. Jaw support 66 carries an integrally attached jaw member 67. Each jaw 67 is fitted with a facing strip 71 of heat-resisting material. Strip 71 is adapted to engage a hot glass article without marring or checking its contacted surface. Piston 64 is moved by air pressure until jaw strip 71 contacts an inner surface of article flange 30a. Upon contact with the inner surface of the flange 30a, jaw strip 71 is stopped and movable cylinder 61 is moved from left-to-right sliding on stationary bars 62. Cylinder 61 has a jaw support 69 attached to the downwardly projecting portion thereof. Jaw support 69 also carries a facing strip 71 of heat-resisting material attached thereto. Strip 71 is adapted to contact an outer opposing surface portion of flange 30a. As the air pressure within the cylinder annulus 63 continues to exert pressure against both the piston 64 and the opposing surface of cylinder head 74, cylinder 61 completes its movement from left-to-right and its jaw strip 71 engages the outer opposing surface of flange 30a. Thus, the facing strips 71 of jaw members 69 and 70 are brought into self-centering engagement with the flange 30a and equalized gripping pressure is applied to opposing surfaces thereof.

Pressurized air is supplied to the two cylinders 61 on both sides of the take-out support ring 76 simultaneously so that opposing flange portions of the article are similarly engaged by self-centering movement of several pairs of jaw structures.

After the jaw strips 71 are engaged, block section 30 is lifted from mold bottom plate 15 by pivotal movement of rails 43 about the horizontal axis of pins 47. Section 30 is then conveyed to a point of discharge by retracting carriage 42 in essentially horizontal movement. Jaws 67 and 69 are opened by supplying air pressure through inlet lines 73 and exhausting the air pressure within annulus 63 through lines 72. Just prior to opening the jaws 67 and 69 the mechanism 60 may be lowered into near relation with the conveyor 55 by operation of air motor 51 to pivot the rails 43 downwardly. The jaws are then opened to deposit the block section 30 on conveyor belt 55 for conveyance to subsequent operations such as thermal sealing of block halves and/or lehring the completed units.

A pair of adjustable spacing plates 77 are mounted on a central portion of each horizontal bar 62 to provide for proper disposition of the air cylinder assemblies 61 on bars 62 for handling ware of various sizes. Spacing plates 77 are segmented to permit their removal or insertion and are of different lengths to surround the pairs of bars 62 for handling ware of different sizes for individual production campaigns. Thus, to handle smaller ware shorter spacing members than those indicated are employed between the pair of grasping mechanisms 60. The spacing members limit the inward movement of cylinder heads 74 toward each other when air is introduced into air cylinder 61 through inlet lines 73.

Figure 6:
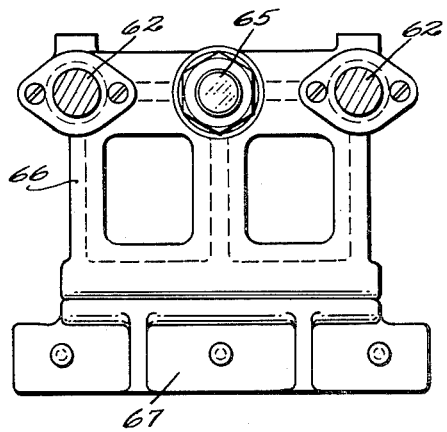
FIG. 6 is a vertical sectional view taken along the line 6—6 of FIG. 4 illustrating an inner jaw structure of the grasping mechanism.

As shown in FIG. 6, inner jaw 67 comprises a generally rectangular plate connected to the lower region of jaw support 66. Jaw support 66 is integrally connected to piston rod 65 by a locking nut and is also slidably mounted on the pair of horizontal bars 62.

Figure 7:
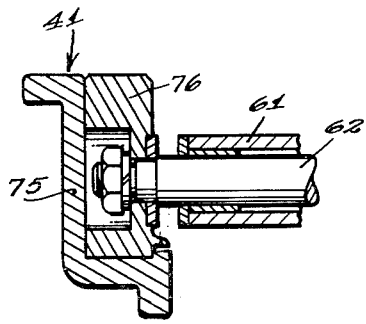
FIG. 7 is a fragmentary vertical sectional view taken along the line 7—7 of FIG. 4 showing a peripheral portion of the grasping mechanism.

As shown in FIG. 7, the body portion of air cylinder 61 is mounted on bars 62 in slidable relationship to facilitate lateral movement of the cylinder assembly independently of lateral or vertical movement of the annular supporting rings 75 and 76 of the take-out device.

Figure 8:
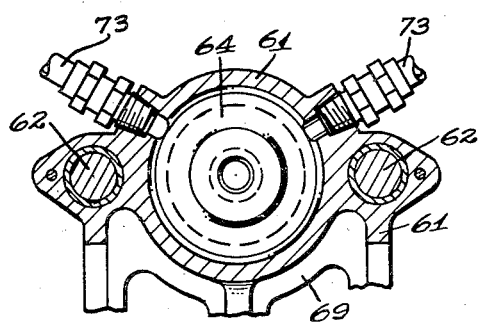
FIG. 8 is a fragmentary vertical sectional view of an air cylinder assembly of the grasping mechanism taken along the line 8—8 of FIG. 5.
Figure 9:
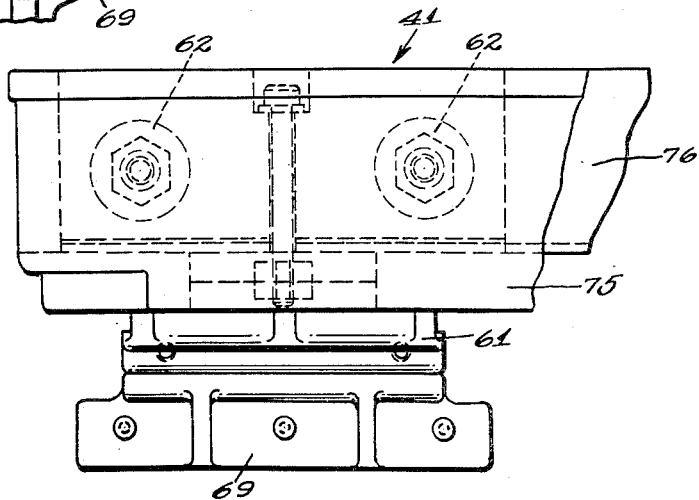
FIG. 9 is a fragmentary side elevational view of the grasping mechanism showing an outer jaw structure.

As shown in FIG. 8, the air cylinder assembly is shown in a sectional view with its cylinder member 61 slidably mounted on bars 62 and carrying outer jaw support 69. Two air lines 73 are shown extending into an upper region of the cylinder to supply jaw closing and opening pressure to the piston 64 and cylinder member 61. In FIG. 9, the cylinder member 61 is shown carrying outer jaw support 69 in a side view. The jaw supports 67 and 69 may be similarly shaped as shown and have essentially equal dimensions.

Operation of the apparatus is as follows:

In the case of sectional molds having ring members 14 as above-described, the ring-lifting device 20 is utilized to elevate each ring at the take-out station to leave a newly-formed block section 30 residing on its bottom plate 15 for immediate removal.

A pair of timing drums 35 (FIG. 1) is used to operate in timed relationship with the forming machine 10 to provide sequential operation of the shell-lifting and take-out devices. Each drum 35 is provided with an air manifold 36 having a series of lead lines extending to individual air operated members of the apparatus.

When the machine indexes to the take-out station shell-lifting device 20 immediately elevates ring 14 disposed thereat and while the ring is being elevated, carriage 42 is moved inwardly by its air piston motor 44 to bring the ware grasping device 41 over the particular mold bottom 15. During this interval pivotal air cylinder 51 elevates the near end of the take-out so that the grasping mechanism 60 is raised with its grasping fingers or plates 67 and 69 above the upwardly-projecting edges of block section 30. This position is shown diagrammatically in broken lines in FIG. 1. When the grasping device 41 is over the article to be transferred, it is lowered by air piston 51 so that the ware grasping plates 67 and 69 are disposed both interiorly and exteriorly of the upper wall portions of the block section. Air cylinder assemblies 61 are then operated by the introduction of compressed air thereinto so that the inner jaw members 67 are brought into initial contact with inner opposing surfaces of the block by movement of pistons 64. The cylinder members 61 move the outer jaws 69 to engage the outer oppositely-disposed surfaces to grasp the block section 30 with balanced pressure applied internally and externally of two individual wall portions. After positive self-centering gripping action is obtained pivoting air motor 51 elevates the carriage 42 and air motor 44 initiates retracting movement exteriorly of the mold table to bring the grasping device 41 over conveyor 55.

After the grasping device 41 leaves the mold area, air motor 51 starts to lower the pivotal rails 43 so that grasping device 41 is lowered into near relationship with the upper surface of conveyor belt 55. When device 41 is over the conveyor belt and in near relationship therewith, grasping mechanism 60 is reversely actuated by air pressure introduced into lines 73 to disengage the jaws from the block section allowing it to drop free through a short distance onto the conveyor belt.

The ring-lifting and take-out apparatus is arranged to operate through nearly their full individual cycles with some degree of overlap to secure rapid although non-conflicting movement while the forming machine is at rest. The apparatus is arranged to operate in timed synchronism with the forming machine for the automatic removal of newly-formed block sections from the mold table.

The present apparatus may also be operated with partible molds which swing open in a horizontal plane by locking the ring-lifting device in an upper position and utilizing the take-out apparatus 40 alone, there being no conflict between the ring-lift mounted over the forming machine and the take-out apparatus.

Various other modifications may be resorted to within the spirit and scope of the appended claims.

We claim:

1. In a take-out device having ware grasping jaws movable with respect to each other and conjunctively between loading and unloading positions of said device, combined apparatus comprising a mounting ring having at least one stationary depending traverse bar attached thereto, at least one pair of grasping jaws, a fluid-operated motor slidably supported on said traverse bar having movable cylinder and piston elements each adapted to independent movement with respect to said ring member and traverse bar, a pair of grasping jaw supports movable toward and away from each other having one grasping jaw individual to each, one jaw support attached to the piston element and the other jaw support attached to the cylinder element of said motor, the said grasping jaws being disposed in confronting aligned relation adapted to both individual and simultaneous movement.

2. In a take-out device having ware grasping jaws movable with respect to each other and conjunctively between loading and unloading positions of said device, the combination of an annular mounting frame, at least one stationary mounting member attached to and depending from said frame, at least one pair of grasping jaws, an air cylinder motor having a movable cylinder and movable piston slidably supported by said mounting member individual to each pair of grasping jaws, a pair of jaw supports carrying said pair of grasping jaws movable toward and away from each other, said jaw supports being individually attached to said movable cylinder and piston of said motor, a pair of oppositely-arranged heat-resistant facing strips disposed on the inner faces of said grasping jaws, the said jaws and facing strips being disposed in confronting aligned relation for engaging and transferring the said ware.

3. In a take-out device having article grasping jaws movable with respect to each other for self-centering article engagement and transference, the combination of a mounting frame comprising an annular ring, at least one stationary rod-like member having its ends attached to opposite sides of said annular ring in fixed relation, at least two sets of similar grasping jaws, a fluid-operated motor disposed on said rod-like member individual to each set of grasping jaws, each motor having movable cylinder and movable piston elements adapted to independent slidable movement on said rod-like member, a pair of grasping jaw supports individual to and retaining each set of grasping jaws, one jaw support attached to the movable piston and the other jaw support attached to the movable cylinder of said motor, each set of grasping jaws being disposed in confronting aligned relation adapted to engage and transfer the said article.

4. Take-out apparatus for article handling such as transferring a readily distortable article from one location to another without deformation, said apparatus comprising a rigid hollow frame pivotally mounted at an intermediate region for vertical movement about a generally horizontal axis, said frame having a track consisting of spaced parallel rails, a movable carriage mounted on said track for lateral movement thereover, article grasping means attached to and projecting from said movable carriage, said grasping means comprising at least one pair of gripping jaws, a fluid-operated motor having movable cylinder and piston elements supported by said movable carriage, each element capable of both independent and conjunctive movement with respect to the other and each supporting one of said jaws in opposing relation, said pair of gripping jaws adapted to self-centering engagement with and applying balanced gripping pressure to the contacted portion of said article, means adapted to move said carriage reciprocatably over said track between loading and unloading positions, and means adapted to pivot said hollow frame and track in a vertical direction.

5. The apparatus in accordance with claim 4, including timing means interconnected with said carriage moving means, frame and track pivoting means, and article grasping means to effect reciprocating lateral movement of said carriage, vertical movement of said frame and track carrying said movable carriage, and engagement and disengagement of the article by said grasping means respectively.

6. The apparatus in accordance with claim 4, wherein said means adapted to pivot said hollow frame and track in a vertical direction comprises a fluid-operated motor.

7. The apparatus in accordance with claim 4, wherein said means adapted to move said carriage reciprocatably over said track between loading and comprises a fluid-operated motor mounted on said pivoted hollow frame.

8. The apparatus in accordance with claim 4, wherein said fluid-operated motor having movable cylinder and piston elements each supporting one of said jaws is double acting for positive engagement and disengagement with the article and slidably supported on said carriage for self-centering balanced application of gripping pressure.

9. The apparatus in accordance with claim 4, wherein said gripping jaws have heat-resistant durable opposing faces disposed in confronting aligned relation for handling articles at an elevated temperature.

10. Take-out apparatus for article handling such as transferring a heat-softened distortable article from one location to another without deformation, said apparatus comprising a rigid hollow frame pivotally mounted at an intermediate region for vertical movement about a generally horizontal axis, said frame having a track consisting of spaced-apart parallel rails, a movable carriage having a series of rollers mounted on said track for lateral movement thereover, article grasping means supported by and projecting downwardly from said movable carriage, said grasping means comprising two pairs of substantially similar grasping jaws disposed in spaced arrangement, two fluid-operated motors each having movable cylinder and piston elements slidably supported by said carriage one being individual to each pair of grasping jaws, one grasping jaw being supported by the cylinder element and the other by the piston element of each motor, each pair of grasping jaws having confronting aligned opposing faces adapted to self-centering balanced gripping of said article, a source of pressurized fluid to actuate the said fluid-operated motors carrying said pairs of grasping jaws, a second fluid-operated motor mounted on said hollow frame adapted to move said carriage reciprocatably over said track between loading and unloading positions, and a third fluid-operated motor adapted to pivot said hollow frame in a vertical direction.

References Cited in the file of this patent
UNITED STATES PATENTS

| | | |
|---|---|---|
| 1,400,801 | Cohen | Dec. 20, 1921 |
| 1,430,226 | Goodreau | Sept. 26, 1922 |
| 2,191,143 | Haitt et al. | Feb. 20, 1940 |
| 2,277,828 | Morgan | Mar. 31, 1942 |
| 2,565,965 | Hartmann | Aug. 28, 1951 |
| 2,713,419 | Hayes | July 19, 1955 |
| 2,732,083 | Smith | Jan. 24, 1956 |
| 2,840,954 | Ramsey | July 1, 1958 |